(12) United States Patent
Kopp-Vaughan et al.

(10) Patent No.: US 10,228,137 B2
(45) Date of Patent: Mar. 12, 2019

(54) DUAL FUEL NOZZLE WITH SWIRLING AXIAL GAS INJECTION FOR A GAS TURBINE ENGINE

(71) Applicant: UNITED TECHNOLOGIES CORPORATION, Hartford, CT (US)

(72) Inventors: Kristin Kopp-Vaughan, East Hartford, CT (US); Timothy S Snyder, Glastonbury, CT (US); Randolph J Smith, Ellington, CT (US); Zhongtao Dai, Manchester, CT (US)

(73) Assignee: United Technologies Corporation, Farmington, CT (US)

( * ) Notice: Subject to any disclaimer, the term of this patent is extended or adjusted under 35 U.S.C. 154(b) by 366 days.

(21) Appl. No.: 14/914,802

(22) PCT Filed: Aug. 19, 2014

(86) PCT No.: PCT/US2014/051585
§ 371 (c)(1),
(2) Date: Feb. 26, 2016

(87) PCT Pub. No.: WO2015/076883
PCT Pub. Date: May 28, 2015

(65) Prior Publication Data
US 2016/0209038 A1    Jul. 21, 2016

Related U.S. Application Data

(60) Provisional application No. 61/872,306, filed on Aug. 30, 2013.

(51) Int. Cl.
*F23R 3/12* (2006.01)
*F23R 3/14* (2006.01)
(Continued)

(52) U.S. Cl.
CPC .............. *F23R 3/14* (2013.01); *F23C 1/08* (2013.01); *F23D 11/106* (2013.01); *F23R 3/28* (2013.01);
(Continued)

(58) Field of Classification Search
CPC ...... F23R 3/12; F23R 3/14; F23R 3/28; F23R 3/36; F23D 11/106; F23D 11/107
See application file for complete search history.

(56) References Cited

U.S. PATENT DOCUMENTS

| | | | |
|---|---|---|---|
| 3,691,765 A | * | 9/1972 | Carlisle ................. F23D 17/002 239/432 |
| 3,713,588 A | * | 1/1973 | Sharpe ................. F23D 11/107 239/400 |

(Continued)

OTHER PUBLICATIONS

European Extended Search Report dated Mar. 3, 2017, issued in the corresponding European Patent Application No. 14864668.0.

*Primary Examiner* — Todd E Manahan
*Assistant Examiner* — Eric Linderman
(74) *Attorney, Agent, or Firm* — Bachman & LaPointe, P.C.

(57) ABSTRACT

A fuel nozzle for a combustor of a gas turbine engine includes an outer air swirler along an axis, the outer air swirler defines an outer annular air passage. An inner air swirler along the axis defines an annular fuel gas passage around the axis between the outer air swirler and the inner air swirler, the annular fuel gas passage terminates with a multiple of skewed slots.

9 Claims, 9 Drawing Sheets

(51) Int. Cl.
*F23R 3/28* (2006.01)
*F23R 3/36* (2006.01)
*F23D 11/10* (2006.01)
*F23C 1/08* (2006.01)

(52) U.S. Cl.
CPC .............. *F23R 3/36* (2013.01); *F23D 11/107* (2013.01); *F23D 2900/11101* (2013.01); *F23R 3/12* (2013.01); *Y02T 50/675* (2013.01)

(56) References Cited

U.S. PATENT DOCUMENTS

| | | | | |
|---|---|---|---|---|
| 3,831,854 | A * | 8/1974 | Sato | F23D 11/00 239/406 |
| 3,841,565 | A * | 10/1974 | Buisson | F02K 9/52 239/488 |
| 3,899,884 | A * | 8/1975 | Ekstedt | F23R 3/04 60/737 |
| 4,311,277 | A * | 1/1982 | Stratton | F23D 17/002 239/400 |
| 4,342,198 | A * | 8/1982 | Willis | F23D 17/002 239/400 |
| 4,600,151 | A * | 7/1986 | Bradley | F23D 11/107 239/400 |
| 4,977,740 | A * | 12/1990 | Madden | F23D 17/002 239/424.5 |
| 5,062,792 | A * | 11/1991 | Maghon | F23C 7/004 239/400 |
| 5,094,610 | A * | 3/1992 | Mandai | F23C 7/004 110/262 |
| 5,295,352 | A * | 3/1994 | Beebe | F23D 14/02 239/404 |
| 5,303,554 | A * | 4/1994 | Faulkner | F23R 3/14 60/737 |
| 5,417,054 | A * | 5/1995 | Lee | F02B 77/04 239/406 |
| 5,505,045 | A * | 4/1996 | Lee | F23D 11/107 239/424 |
| 5,761,907 | A * | 6/1998 | Pelletier | F23D 11/107 239/397.5 |
| 5,826,423 | A * | 10/1998 | Lockyer | F23C 7/008 60/39.463 |
| 6,073,436 | A * | 6/2000 | Bell | F02C 7/232 60/39.094 |
| 6,076,356 | A * | 6/2000 | Pelletier | F23D 11/107 60/740 |
| 6,119,459 | A * | 9/2000 | Gomez | F23C 7/004 60/748 |
| 6,199,368 | B1 * | 3/2001 | Onoda | F02C 3/28 60/39.463 |
| 6,240,731 | B1 * | 6/2001 | Hoke | F23C 6/045 239/400 |
| 6,276,141 | B1 * | 8/2001 | Pelletier | F23D 11/107 60/740 |
| 6,354,072 | B1 * | 3/2002 | Hura | F23D 11/107 60/776 |
| 7,464,553 | B2 * | 12/2008 | Hsieh | F23R 3/14 60/740 |
| 9,739,488 | B2 * | 8/2017 | Koizumi | F23R 3/286 |
| 2002/0011064 | A1 | 1/2002 | Crocker et al. | |
| 2002/0134084 | A1 * | 9/2002 | Mansour | F23D 11/107 60/740 |
| 2004/0003596 | A1 * | 1/2004 | Chin | F23R 3/14 60/737 |
| 2005/0086944 | A1 * | 4/2005 | Cowan | F23D 17/002 60/776 |
| 2005/0279862 | A1 * | 12/2005 | Mao | F23D 11/107 239/403 |
| 2006/0248898 | A1 * | 11/2006 | Buelow | F23R 3/14 60/776 |
| 2007/0137207 | A1 * | 6/2007 | Mancini | F23R 3/14 60/737 |
| 2007/0289305 | A1 * | 12/2007 | Oda | F23D 11/383 60/748 |
| 2008/0078183 | A1 * | 4/2008 | Ziminsky | F23R 3/14 60/776 |
| 2009/0044538 | A1 * | 2/2009 | Pelletier | F23R 3/14 60/740 |
| 2009/0173057 | A1 * | 7/2009 | Yoshida | F01D 15/10 60/39.281 |
| 2009/0224080 | A1 * | 9/2009 | Chew | F23D 11/107 239/589 |
| 2009/0255258 | A1 * | 10/2009 | Bretz | F23D 11/107 60/737 |
| 2009/0255262 | A1 * | 10/2009 | McMasters | F23R 3/14 60/742 |
| 2009/0277176 | A1 | 11/2009 | Caples | |
| 2010/0050644 | A1 * | 3/2010 | Pidcock | F23D 11/107 60/737 |
| 2010/0089066 | A1 * | 4/2010 | Mina | F23D 1/06 60/772 |
| 2010/0251720 | A1 * | 10/2010 | Pelletier | F23D 11/107 60/740 |
| 2010/0300105 | A1 * | 12/2010 | Pelletier | F23D 11/103 60/740 |
| 2011/0089264 | A1 | 4/2011 | Thomson et al. | |
| 2012/0047903 | A1 * | 3/2012 | Williams | F02C 7/22 60/746 |
| 2012/0111016 | A1 * | 5/2012 | Lockyer | F02C 7/222 60/772 |
| 2012/0151928 | A1 * | 6/2012 | Patel | F23D 11/383 60/737 |
| 2012/0151930 | A1 * | 6/2012 | Patel | F23D 11/383 60/746 |
| 2012/0234013 | A1 * | 9/2012 | Overman | F23C 9/006 60/772 |
| 2013/0036739 | A1 * | 2/2013 | Horikawa | F23R 3/14 60/735 |
| 2013/0047620 | A1 | 2/2013 | Mao et al. | |
| 2013/0263605 | A1 * | 10/2013 | Baruah | F23R 3/12 60/772 |
| 2014/0069079 | A1 * | 3/2014 | Koizumi | F23R 3/12 60/39.463 |
| 2014/0190168 | A1 * | 7/2014 | Shershnyov | F23R 3/283 60/737 |
| 2014/0246518 | A1 * | 9/2014 | Myers | F02M 61/162 239/406 |
| 2014/0260302 | A1 * | 9/2014 | Menon | F23R 3/14 60/776 |
| 2015/0253010 | A1 * | 9/2015 | Schlein | F23L 7/002 60/776 |
| 2016/0209037 | A1 * | 7/2016 | Dai | F23R 3/14 |
| 2016/0377293 | A1 * | 12/2016 | Short | F23R 3/283 60/738 |

* cited by examiner

DUAL FUEL NOZZLE WITH SWIRLING AXIAL GAS INJECTION FOR A GAS TURBINE ENGINE

CROSS-REFERENCE TO RELATED APPLICATION

This application claims the benefit of provisional application Ser. No. 61/872,306, filed Aug. 30, 2013.

BACKGROUND

The present disclosure relates to a gas turbine engine and, more particularly, to duel fuel nozzles with passages for both a liquid and a gas.

Gas turbine engines, such as Industrial Gas Turbines utilized in power production, mechanical drives as well as aero engines in commercial and military aircraft, include a compressor section to pressurize airflow, a combustor section to burn a hydrocarbon fuel in the presence of the pressurized air, and a turbine section to extract energy from the resultant combustion gases.

The combustor section includes a multiple of circumferentially distributed fuel nozzles that project into a forward section of a combustion chamber to supply fuel to mix with the pressurized airflow. The fuel nozzles may simultaneously utilize different types and combinations of fuel such as Jet-A, diesel, JP8, natural gas and others. Further, to facilitate lower NOx emissions, water may be injected though the nozzle as well. Although effective, the water-to-fuel ratio may result in decreased circumferential uniformity and swirl.

SUMMARY

A fuel nozzle for a combustor of a gas turbine engine according to one disclosed non-limiting embodiment of the present disclosure includes an outer air swirler along an axis, the outer air swirler defines an outer annular air passage; and an inner air swirler along the axis to define an annular fuel gas passage around the axis between the outer air swirler and the inner air swirler, the annular fuel gas passage terminates with a multiple of skewed slots.

A further embodiment of the present disclosure includes, wherein each of the multiple of skewed slots are at least partially defined by a vane within the annular fuel gas passage.

A further embodiment of any of the foregoing embodiments of the present disclosure includes, wherein each of the multiple of skewed slots are angled with respect to the axis at an angle at an angle greater than an angle of swirl of either of a surrounding air stream.

A further embodiment of any of the foregoing embodiments of the present disclosure includes, wherein a trailing edge of the multiple of skewed slots at least partially form a boundary of each of the skewed slots.

A further embodiment of any of the foregoing embodiments of the present disclosure includes, wherein each of the multiple of skewed slots are quadrilateral in shape.

A further embodiment of any of the foregoing embodiments of the present disclosure includes, wherein each of the multiple of skewed slots are at least partially defined by a vane that extends radially inward from an inner wall of the outer air seal.

A further embodiment of any of the foregoing embodiments of the present disclosure includes, wherein each vane extends radially inward toward an outer wall of the inner air seal.

A further embodiment of any of the foregoing embodiments of the present disclosure includes an air inflow tube along the axis within the inner air swirler, the air inflow tube defines a central air passage.

A further embodiment of any of the foregoing embodiments of the present disclosure includes a helical inflow vane within the air inflow tube.

A further embodiment of any of the foregoing embodiments of the present disclosure includes, wherein the inner air swirler and the air inflow tube define an annular liquid passage therebetween.

A further embodiment of any of the foregoing embodiments of the present disclosure includes, wherein the annular gas passage terminates with the multiple of skewed slots.

A further embodiment of any of the foregoing embodiments of the present disclosure includes, wherein the annular gas passage directs about one hundred (100) percent of a fuel gas through the multiple of skewed slots.

A further embodiment of any of the foregoing embodiments of the present disclosure includes, wherein the multiple of skewed slots impart a swirl to the fuel gas.

A method of directing a fuel gas and a liquid through a fuel nozzle and into a combustor of a gas turbine engine according to another disclosed non-limiting embodiment of the present disclosure includes directing an airflow through an outer annular air passage; directing about one hundred (100) percent of the fuel gas through an annular fuel gas passage radially within the outer annular air passage; and directing the liquid though an annular liquid passage radially within the annular fuel gas passage.

A further embodiment of any of the foregoing embodiments of the present disclosure includes swirling the fuel gas through a multiple of skewed slots.

A further embodiment of any of the foregoing embodiments of the present disclosure includes defining a quadrilateral exit for each of the multiple of skewed slots.

A further embodiment of any of the foregoing embodiments of the present disclosure includes directing an airflow through a central passage radially within the annular liquid passage.

A further embodiment of any of the foregoing embodiments of the present disclosure includes swirling the airflow within the central passage.

A further embodiment of any of the foregoing embodiments of the present disclosure includes directing the airflow through the outer annular air passage at least partially radially inward.

A further embodiment of any of the foregoing embodiments of the present disclosure includes directing the liquid at least partially radially inward.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
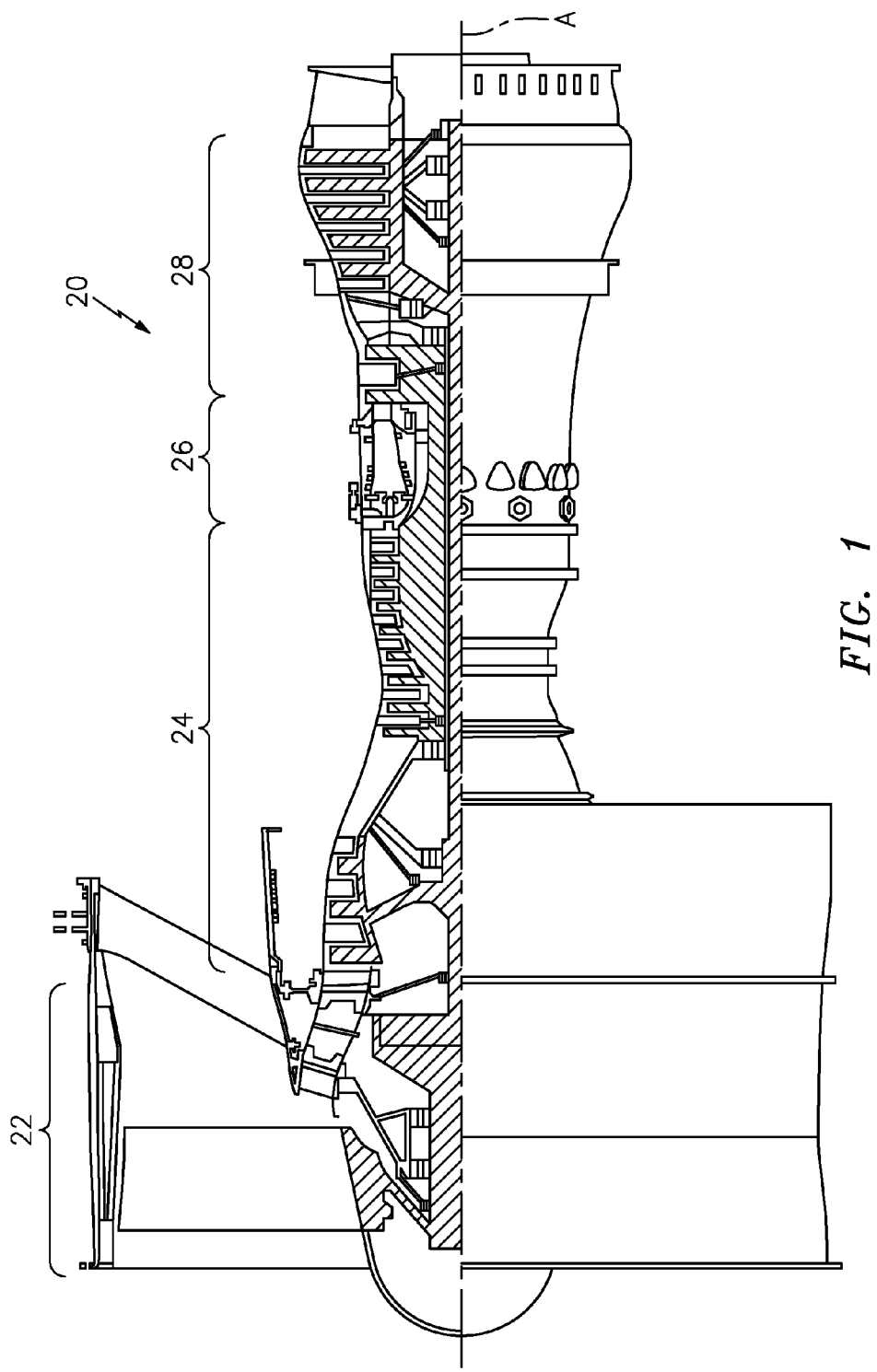
FIG. 1 is a schematic cross-section of an example gas turbine engine architecture.
Figure 2:
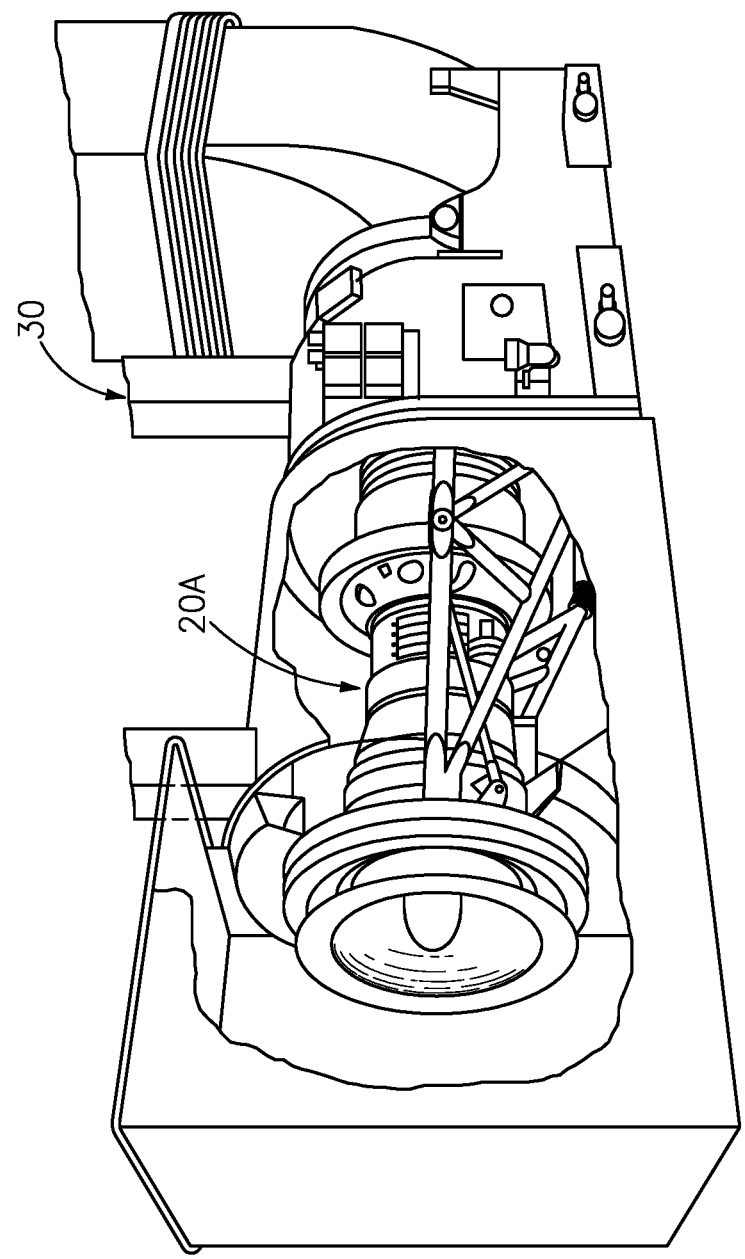
FIG. 2 is a schematic cross-section of another example gas turbine engine architecture.

FIG. 1 schematically illustrates a gas turbine engine 20. The gas turbine engine 20 is disclosed herein as a two-spool turbo fan that generally includes a fan section 22, a compressor section 24, a combustor section 26 and a turbine section 28. The fan section 22 drives air along a bypass flowpath and into the compressor section 24. The compressor section 24 drives air along a core flowpath for compression and communication into the combustor section 26, which then expands and directs the air through the turbine section 28. Although depicted as a turbofan in the disclosed non-limiting embodiment, it should be understood that the concepts described herein are not limited to use with turbofans as the teachings may be applied to other types of turbine engines such as a low bypass augmented turbofan, turbojets, turboshafts, and three-spool (plus fan) turbofans with an intermediate spool. Still other engine architectures 20A are located within an enclosure 30 (FIG. 2) typical of an industrial gas turbine (IGT).

Figure 3:
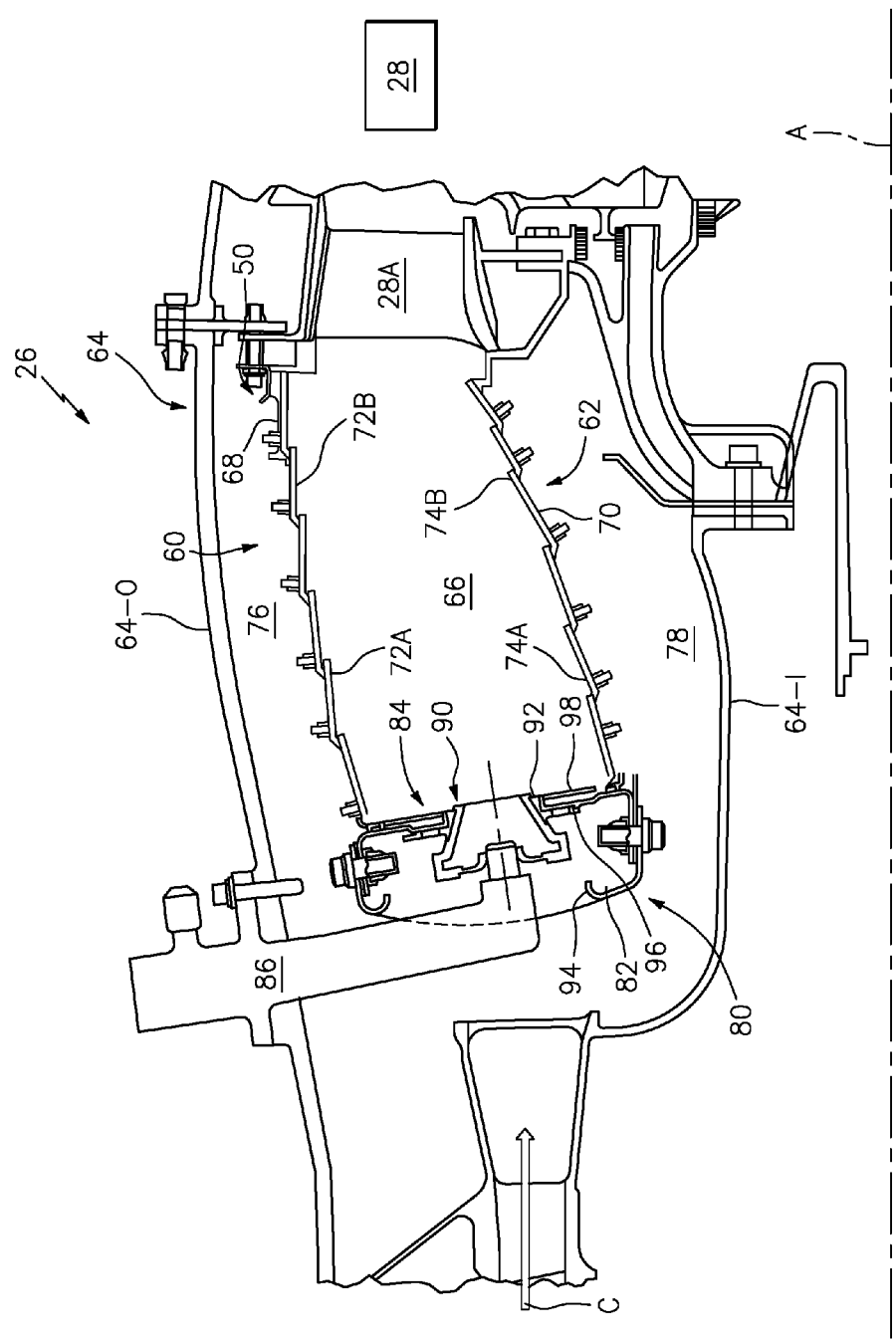
FIG. 3 is an expanded longitudinal schematic sectional view of a combustor section according to one non-limiting embodiment.

With reference to FIG. 3, the combustor section 26 generally includes a combustor 50 with an outer combustor wall assembly 60, an inner combustor wall assembly 62 and a diffuser case 64. The outer combustor wall assembly 60 and the inner combustor wall assembly 62 are spaced apart such that a combustion chamber 66 is defined therebetween. The combustion chamber 66 may be generally annular in shape.

The outer combustor liner assembly 60 is spaced radially inward from an outer diffuser case 64A of the diffuser case module 64 to define an outer annular plenum 76. The inner combustor liner assembly 62 is spaced radially outward from an inner diffuser case 64B of the diffuser case module 64 to define an inner annular plenum 78. It should be understood that although a particular combustor is illustrated, other combustor types with various combustor liner arrangements will also benefit herefrom. It should be further understood that the disclosed cooling flow paths are but an illustrated embodiment and should not be limited only thereto.

The combustor wall assemblies 60, 62 contain the combustion products for direction toward the turbine section 28. Each combustor wall assembly 60, 62 generally includes a respective support shell 68, 70 which supports one or more liner panels 72, 74 mounted to a hot side of the respective support shell 68, 70. Each of the liner panels 72, 74 may be generally rectilinear and manufactured of, for example, a nickel based super alloy, ceramic or other temperature resistant material and are arranged to form a liner array. In one disclosed non-limiting embodiment, the liner array includes a multiple of forward liner panels 72A and a multiple of aft liner panels 72B that are circumferentially staggered to line the hot side of the outer shell 68. A multiple of forward liner panels 74A and a multiple of aft liner panels 74B are circumferentially staggered to line the hot side of the inner shell 70.

The combustor 50 further includes a forward assembly 80 immediately downstream of the compressor section 24 to receive compressed airflow therefrom. The forward assembly 80 generally includes an annular hood 82 and a bulkhead assembly 84 which locate a multiple of fuel nozzles 86 (one shown) and a multiple of swirlers 90 (one shown). Each of the swirlers 90 is mounted within an opening 92 of the bulkhead assembly 84 to be circumferentially aligned with one of a multiple of annular hood ports 94. Each bulkhead assembly 84 generally includes a bulkhead support shell 96 secured to the combustor wall assembly 60, 62, and a multiple of circumferentially distributed bulkhead liner panels 98 secured to the bulkhead support shell 96.

The annular hood 82 extends radially between, and is secured to, the forwardmost ends of the combustor wall assemblies 60, 62. The annular hood 82 forms the multiple of circumferentially distributed hood ports 94 that accommodate the respective fuel nozzle 86 and introduce air into the forward end of the combustion chamber 66. Each fuel nozzle 86 may be secured to the diffuser case module 64 and project through one of the hood ports 94 and the respective swirler 90.

The forward assembly 80 introduces core combustion air into the forward section of the combustion chamber 66 while the remainder enters the outer annular plenum 76 and the inner annular plenum 78. The multiple of fuel nozzles 86 and adjacent structure generate a blended fuel-air mixture that supports stable combustion in the combustion chamber 66.

Opposite the forward assembly 80, the outer and inner support shells 68, 70 are mounted to a first row of Nozzle Guide Vanes (NGVs) 28A. The NGVs 28A are static engine components which direct the combustion gases onto the turbine blades in the turbine section 28 to facilitate the conversion of pressure energy into kinetic energy. The combustion gases are also accelerated by the NGVs 28A because of their convergent shape and are typically given a "spin" or a "swirl" in the direction of turbine rotation.

Figure 4:
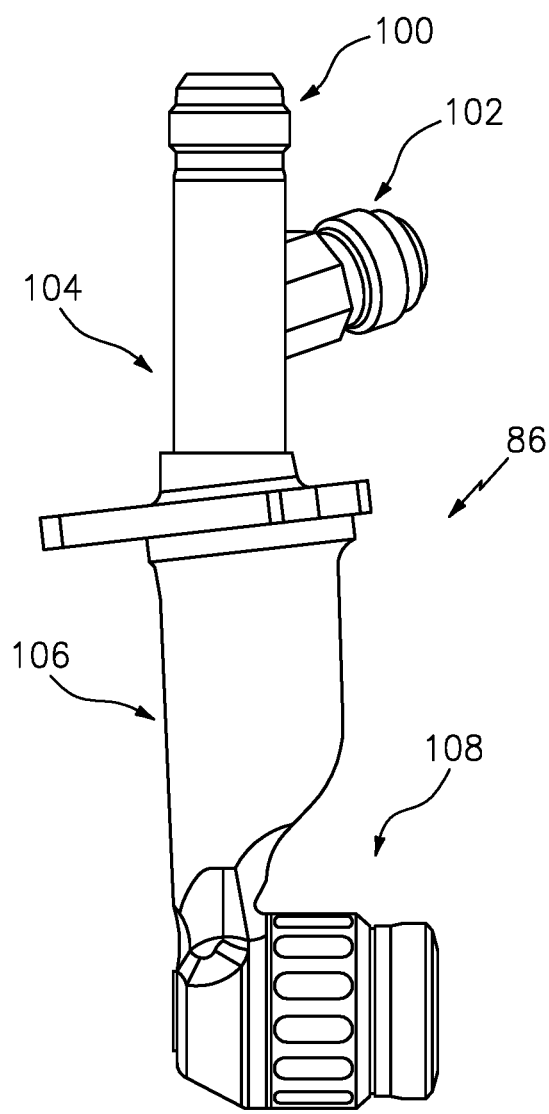
FIG. 4 is an isometric view of a fuel injector.

With reference to FIG. 4, each fuel injector 86 generally includes a first inlet 100 and a second inlet 102 defined by an inlet housing 104, a support housing 106 and a nozzle assembly 108. The first inlet 100 is transverse to the second inlet 102. The inlet housing 104 is received within the support housing 106 and a tube 110 extends through the housings 102, 104 (FIG. 5).

Figure 5:
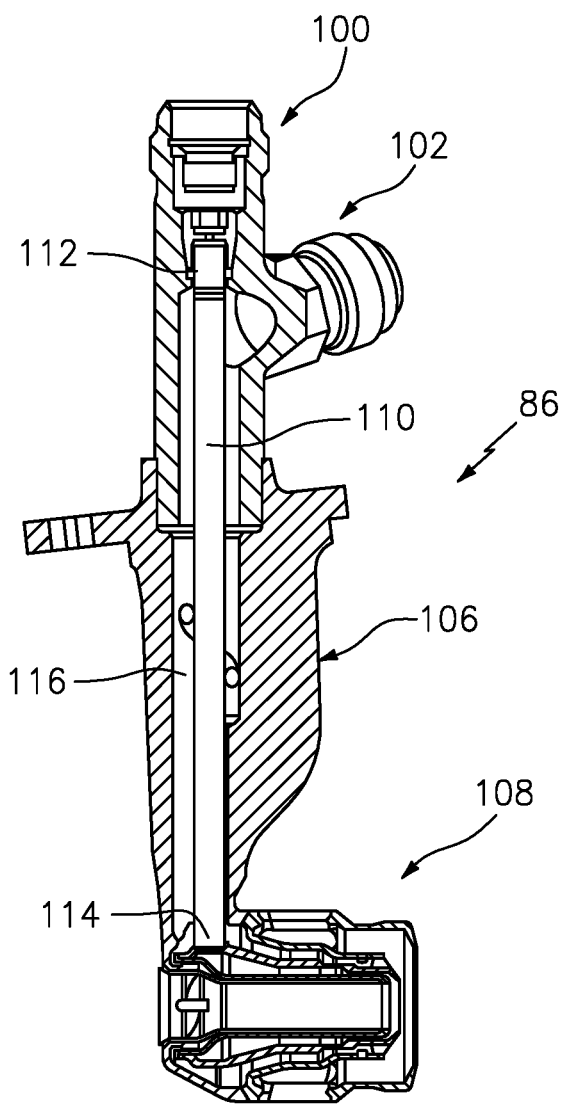
FIG. 5 is a sectional view of the fuel injector of FIG. 4.

With reference to FIG. 5, the first inlet 100 may receive a first fluid such as a liquid and the second inlet 102 may receive a second fluid such as a gas. The fuel injector 86 in the disclosed non-limiting embodiment provides concentric passages for a liquid such as Jet-A, diesel, JP8, water and combinations thereof as well as a gas such as natural gas. Each of the fuels are communicated through separate concentric passages within the fuel injector 86 such that gas turbine engine 20 readily operates on either fuel or combinations thereof.

The tube 110 separates the liquid from the gas. The tube 110 is secured within the inlet housing 104 with a seal such as an O-ring at one end section 112 and at the opposite end section 114 in the nozzle assembly 108 via a braze, weld, thread or other attachment. The tube 110 defines an annular gas passage 116 within the housings 104, 106 that operates as a heat shield to minimize or prevent coking of the liquid through the tube 110.

Figure 6:
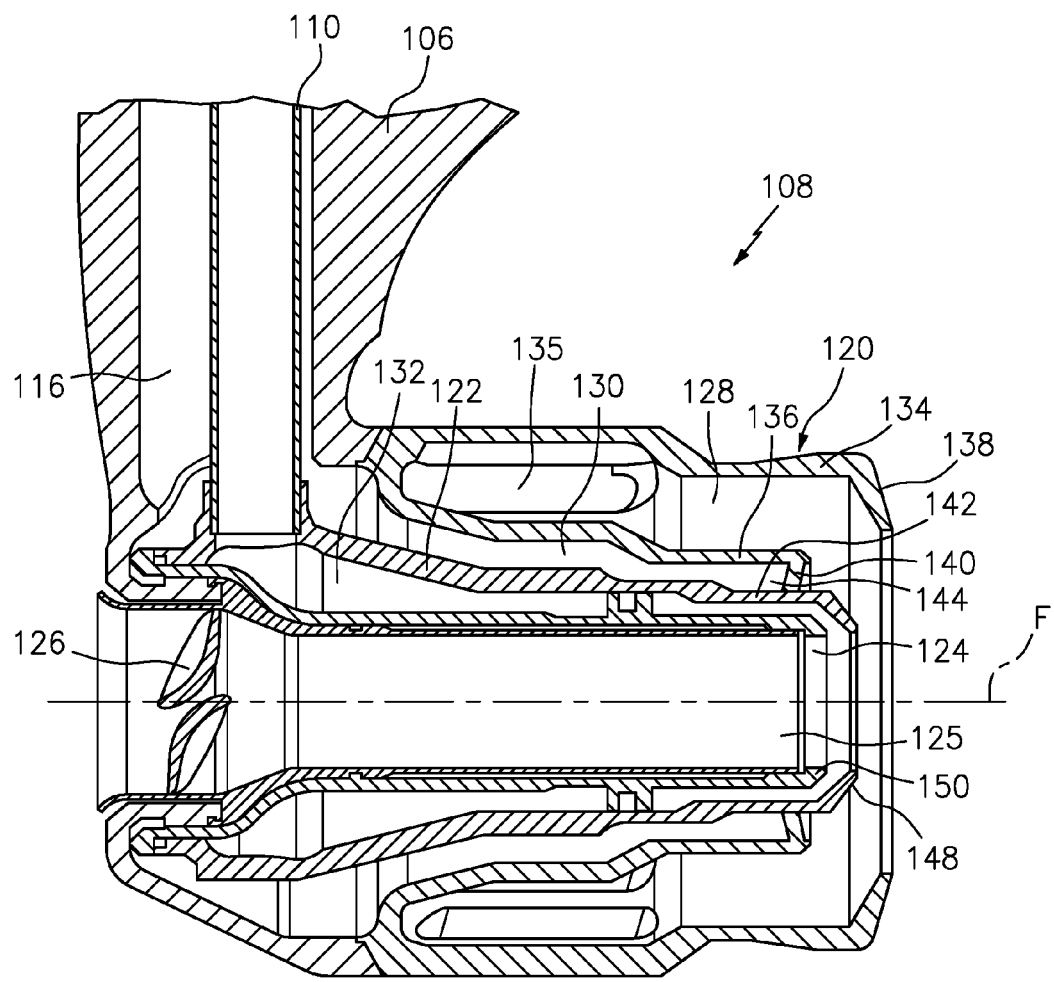
FIG. 6 is an expanded sectional view of a fuel nozzle.

With reference to FIG. 6, the nozzle assembly 108 is at least partially received within the swirler 90 and generally includes an outer air swirler 120, an inner air swirler 122 and an air inflow tube 124 with a helical inflow vane 126 along a nozzle axis F. An outer annular air passage 128 is defined around axis F and within the outer air swirler 120. An annular fuel gas passage 130 is defined around axis F and between the outer air swirler 120 and the inner air swirler 122. The annular fuel gas passage 130 receives the fuel gas from within the annular gas passage 116 around the tube 110. An annular liquid passage 132 is defined around axis F and between the inner air swirler 122 and the air inflow tube 124. The annular liquid passage 132 receives the liquid from within the tube 110. A central air passage 125 is defined along axis F within the air inflow tube 124.

The outer annular air passage 128 is defined between an outer wall 134 and an inner wall 136 of the outer air swirler 120. An end section 138 of the outer wall 134 and an end section 140 of the inner wall 136 may be turned radially inward toward axis F to direct the airflow at least partially radially inward. The outer wall 134 of the outer air swirler 120 includes a multiple of axial slots 135 which receive airflow therethrough. It should be appreciated that various geometries outer air swirler 120 will benefit herefrom.

Figure 7:
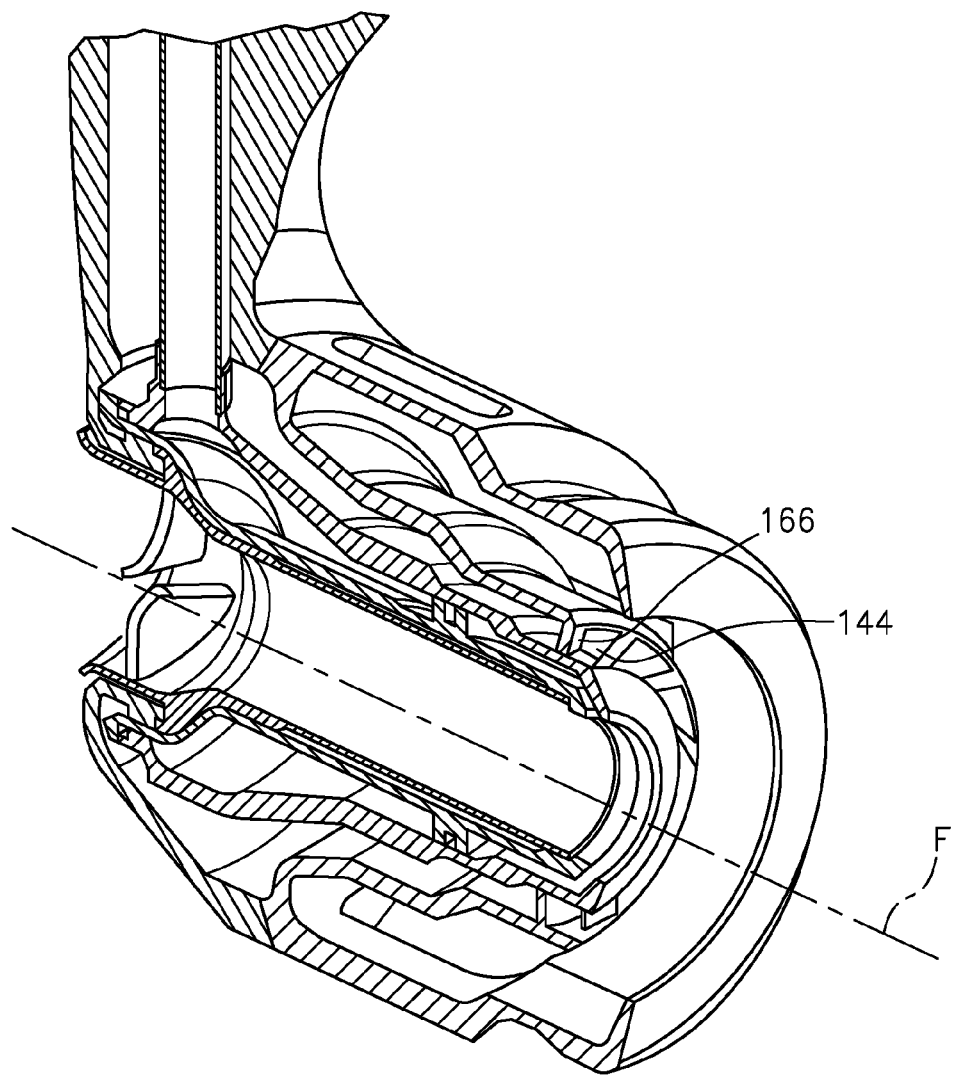
FIG. 7 is a perspective sectional view of the fuel nozzle.

The end section 140 of the inner wall 136 abuts an outer wall 142 of the inner air swirler 122 to defines a multiple of skewed slots 144 (best seen in FIG. 7) to form an axial swirled exit for the annular gas passage 130. That is, the annular gas passage 130 terminates with the multiple of skewed slots 144.

The annular gas passage 130 communicates essentially all, e.g., about one hundred (100) percent of the fuel gas through the multiple of skewed slots 144. The multiple of skewed slots 144 direct the gas axially and imparts a swirl thereto. Each of the multiple of skewed slots 144 in the disclosed non-limiting embodiment are skewed quadrilaterals in shape (best seen in FIG. 8). In one disclosed non-limiting embodiment, the multiple of skewed slots 144 are skewed at an angle α (FIG. 9) between about fifty to sixty (50-60) degrees around the axis F. In this disclosed non-limiting embodiment, the angle is typically greater than an angle of swirl of either of the surrounding air streams.

The outer wall 142 and an inner wall 146 of the inner air swirler 122 define the annular liquid passage 132. An end section 148 of the outer wall 142 and an end section 150 of the inner wall 146 may be turned radially inward toward axis F to direct the liquid at least partially radially inward. The air inflow tube 124 is mounted within the inner wall 146 and includes the upstream helical inflow vane 126 to swirl the airflow therethrough.

Figure 8:
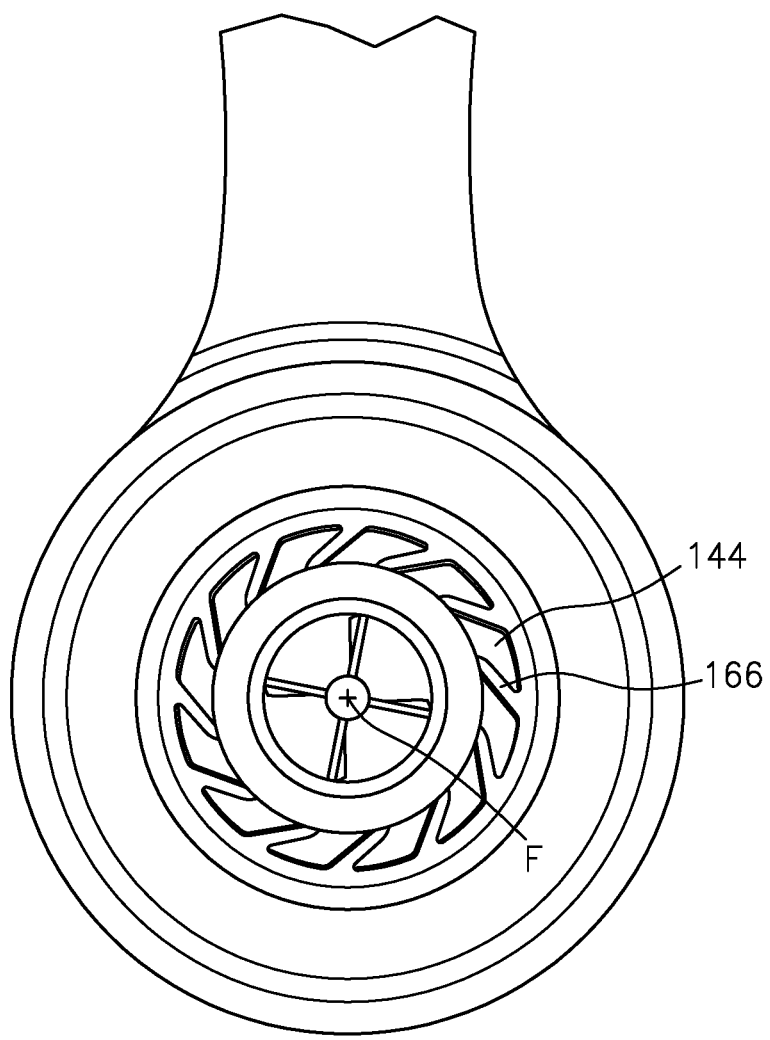
FIG. 8 is an expanded front view of the fuel nozzle.
Figure 9:
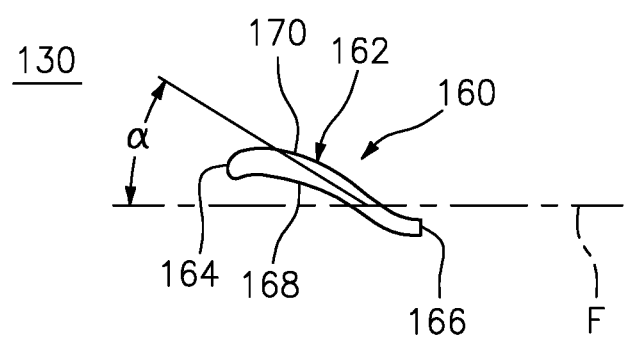
FIG. 9 is a schematic radially inward looking view of a vane for the fuel nozzle according to one disclosed non-limiting embodiment.

With reference to FIG. 9, each of the multiple of skewed slots 144 are at least partially defined by a vane 160 within the annular fuel gas passage 130. Each vane 160 is defined by an airfoil wall surface 162 between a leading edge 164 and a trailing edge 166 to define a generally concave shaped portion to form a pressure side 168 and a generally convex shaped portion forming a suction side 170. Each vane 160 is angled with respect to the axis F at the aforementioned angle α of about fifty to sixty (50-60) degrees such that the trailing edge 166 thereof, the outer air swirler 120 and the inner air swirler 122 form the skewed quadrilateral exits of the skewed slots 144 (FIG. 8).

The multiple of skewed slots 144 decrease the injection area and increase axial swirl momentum to increase circumferential uniformity, total air swirl due to the angle of gas injection and increase air stream mixing downstream of nozzle to facilitate fuel-air mixing.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A fuel nozzle for a combustor of a gas turbine engine comprising:
    an outer air swirler along an axis, the outer air swirler defines an outer annular air passage;
    an inner air swirler along the axis to define an annular fuel gas passage between the outer air swirler and the inner air swirler
    a multiple of vanes within the annular fuel gas passage that extend radially inward from an inner wall of the outer air swirler, each of the multiple of vanes defined by an airfoil wall surface between a leading edge and a trailing edge, the trailing edge of each of the multiple of vanes, the outer air swirler, and the inner air swirler form a multiple of skewed quadrilateral exits such that an angle of swirl from the multiple of skewed quadrilateral exits is greater than an angle of swirl from the outer annular air passage and the annular fuel gas passage;
    an air inflow tube along the axis within the inner air swirler, the air inflow tube defines a central air passage; and
    a helical inflow vane within the air inflow tube, the inner air swirler and the air inflow tube define an annular liquid passage therebetween.

2. The fuel nozzle as recited in claim 1, wherein each of the multiple of skewed slots extends radially inward from an inner wall of an outer air seal.

3. The fuel nozzle as recited in claim 2, wherein each of the multiple of vanes extend radially inward toward an outer wall of the inner air seal.

4. The fuel nozzle as recited in claim 1, wherein the annular gas passage directs one hundred (100) percent of a fuel gas through the multiple of skewed slots.

5. A method of directing a fuel gas and a liquid through a fuel nozzle and into a combustor of a gas turbine engine, comprising:
    directing an airflow through an outer annular air passage;
    directing one hundred (100) percent of the fuel gas through an annular fuel gas passage radially within the outer annular air passage;

directing the liquid though an annular liquid passage radially within the annular fuel gas passage between an inner air swirler and an air inflow tube, a helical inflow vane within the air inflow tube along the axis within the inner air swirler, the air inflow tube defines a central air passage; and swirling the fuel gas through a multiple of vanes within the annular fuel gas passage that extend radially inward from an inner wall of the outer air swirler, each of the multiple of vanes defined by an airfoil wall surface between a leading edge and a trailing edge, the trailing edge of each of the multiple of vanes, the outer air swirler, and the inner air swirler form a multiple of skewed quadrilateral exits such that the angle of swirl from the multiple of skewed quadrilateral exits is greater than an angle of swirl from the outer annular air passage and the annular fuel gas passage.

6. The method as recited in claim 5, further comprising: directing an airflow through the central air passage radially within the annular liquid passage.

7. The method as recited in claim 6, further comprising: swirling the airflow within the central air passage.

8. The method as recited in claim 7, further comprising: directing the airflow through the outer annular air passage at least partially radially inward.

9. The method as recited in claim 8, further comprising: directing the liquid at least partially radially inward.

* * * * *